Jan. 27, 1948.  C. W. EARP  2,434,915
RADIO BEACON SYSTEM FOR BEARING DETERMINATION
Filed April 21, 1943  2 Sheets-Sheet 1
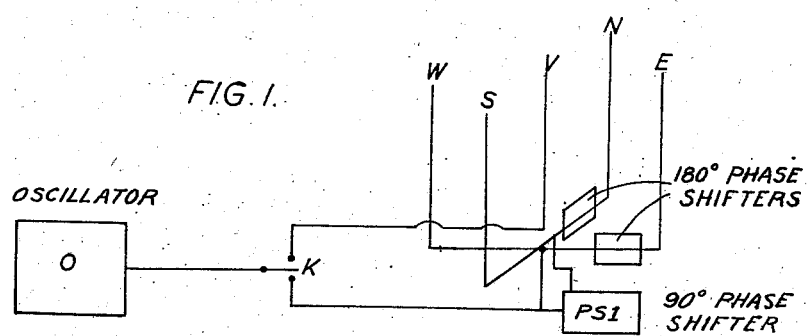
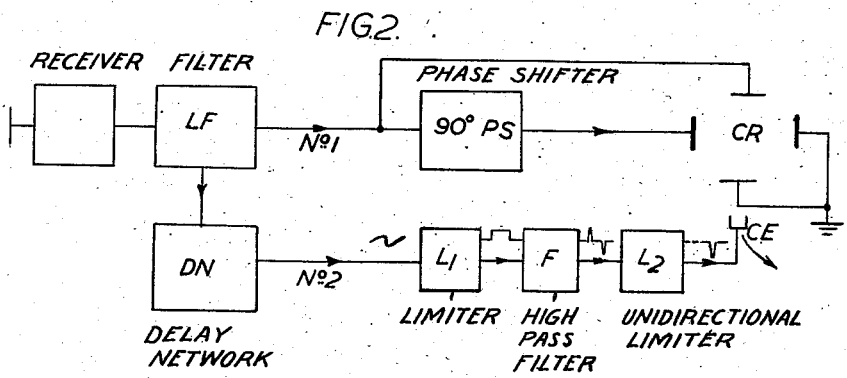
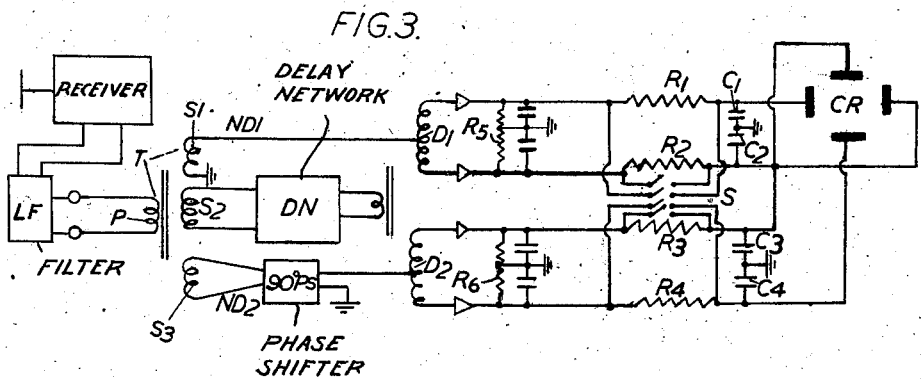
Inventor
C.W. Earp
By E.D. Phinney
Attorney Jan. 27, 1948.          C. W. EARP                 2,434,915
           RADIO BEACON SYSTEM FOR BEARING DETERMINATION
                   Filed April 21, 1943        2 Sheets-Sheet 2

FIG.4.
KEYING RHYTHM BETWEEN ANTENNA SYSTEMS (a)

| PATH NO.1 | A | B | A | B | A |
|---|---|---|---|---|---|
| PATH NO.2 | B | A | B | A | B |
| PHASE DIFFERENCE | θ | -θ | θ | -θ | θ |

(b)

| PATH NO.1 | A | B | A | B | A |
| PATH NO.2 |   | A | B | A | B |
| PHASE DIFFERENCE | θ  N | -θ  N | θ  N | -θ  N | θ |

(c)

| PATH NO.1 | A | B | C | A | B | C |
| PATH NO.2 | C | A | B | C | A | B |
| PHASE DIFFERENCE |   | -θ |   |   | -θ |   |

(d)

| PATH NO.1 | // | A | B | // | A | B |
| PATH NO.2 |    | // | A | B | // | A | B |
| PHASE DIFFERENCE | — | — | N | θ | N | — | — | N | θ | N |

(e)

| PATH NO.1 | A | B | // | A | B |
| PATH NO.2 | // | A | B | // | A | B |
| PHASE DIFFERENCE | — | θ | N | — | — | θ | N |

(f)

| PATH NO.1 | C | A | B | C | A | B | C | A | B | C | A | B | C | A | B |
| PATH NO.2 | C | A | B | C | A | B | C | A | B | C | A | B | C | A |
| PHASE DIFFERENCE | — | θ | — | — | N | θ | — | — | θ | — | — | θ | — | — | θ |

⟶ TIME

A = TRANSMISSION FROM FIRST SYSTEM.
B = TRANSMISSION FROM SECOND SYSTEM.
C = NO TRANSMISSION OR TRANSMISSION ON DIFFERENT FREQUENCY.
θ = PHASE DIFFERENCE.
N = NO INDICATION OR REFERENCE INDICATION.

Inventor
CW Earp
By ED Kinney
Attorney

Patented Jan. 27, 1948

2,434,915

UNITED STATES PATENT OFFICE 2,434,915

RADIO BEACON SYSTEM FOR BEARING DETERMINATION

Charles William Earp, London, England, assignor to Standard Telephones and Cables Limited, London, England, a British company Application April 21, 1943, Serial No. 483,868
In Great Britain May 11, 1942

21 Claims. (Cl. 250—11)

The present invention relates to a method of and arrangements for communicating a phase difference as such or as representative of a quantity or measure to a receiving apparatus, and is particularly applicable to radio beacon systems and co-operating receivers for determining the bearing of the latter with respect to the beacon.

The method of communicating a phase difference between two waves according to the invention comprises transmitting over a single channel two or more waves, respectively in successive periods, and preferably in a predetermined periodic rhythm, at least two of said waves having the same frequency and differing in phase at the receiver by the amount to be communicated, and receiving the transmitted waves over two paths having a differential delay of such value that the duration periods of the waves of equal frequency in the two paths overlap at the outputs of said paths for at least a part of the periods thereof and measuring the phase difference between the waves in the overlapping portions of said durations.

In its application to a radio beacon system for bearing determination the phase difference between the two waves of equal frequency is obtained by transmitting a high frequency from a non-directional antenna system so that at any instant the phase of the field progressively varies in a radial direction and is constant circumferentially around the transmitting system, and also from an antenna system, such as an Adcock system, for example, in which at any instant the phase of the field varies progressively circumferentially around the system, the two transmitting systems being coaxial. Only one antenna system radiates at a time but the antenna systems are keyed to the same transmitter alternately or in other rhythmic sequence. Thus a receiver at any location around the transmitting antenna systems will receive the phased waves of equal frequency in successive periods, the phase difference between the two fields depending upon the angular location of the receiver.

In the application of the invention to a radio system for defining a path, for example a blind approach path, two antenna systems are provided at a distance apart and arranged to have overlapping radiation distributions, and to transmit during respective non-overlapping periods of time waves of equal frequency, and a receiver provided with two electrical paths having a differential delay such that at the outputs of the two paths the waves from the two antenna systems overlap for at least a portion of the transmitting periods and with a phase measuring device to which the outputs from said two paths are applied. A path is defined by a constant phase difference of the waves in the outputs of said two paths during the overlapping periods. Such a transmitting system it will be observed is utilised in the now well known blind approach system utilising overlapping directive radiation distributions and keyed alternately to the transmitter so as to produce in the space of the overlapping fields a continuous signal of constant amplitude. In the present invention, however, the path is defined by constant phase difference of the waves from the two antenna systems. This phase difference is introduced by the difference in the distances between the receiver and the two transmitting antenna systems.

Arrangements at the receiver comprise two electrical paths having a differential delay, which may consist of a delay network in one of the paths, the signals received being fed to both paths, so that at the outputs, the alternately transmitted signals overlap in time and may be thus compared the one with the other for measuring the phase difference or "jump."

By means of the arrangements according to the invention a simple cathode ray oscillograph indication of bearing (or other quantity represented by the phase jump) may be obtained with the particular advantage, as will be made clear hereinafter, that a permanent indication can be provided to show that the receiving apparatus is introducing no error.

Stability of the overall system is very high, a single source of frequency-stable continuous wave being all that is required as transmitter. There is no requirement as to exact speed or rhythm of the transmitter keying.

The invention will now be described as embodied in a radio bearing determining system, reference being made to the accompanying drawings in which Fig. 1 shows a radio beacon system for use in carrying out the invention about to be described; and Figs. 2 and 3 show diagrammatically two receiving arrangements for carrying out the invention;

Fig. 4 shows by means of charts several examples of various rhythms the transmission of the waves can take and their effect at the receiver.

Referring to Fig. 1, a transmitting system is shown comprising an orthodox "Adcock" system composed of four vertical aerials in which the "north-south" pair NS are connected to radiate in phase-opposition, as also are the EW pair. A phasing network PSI, such as a delay network of known form, is connected between NS and EW, so that when the whole system is excited, NS and EW are excited equally in phase quadrature. The fifth aerial V is non-directional and is placed at the centre of the Adcock system. A stable oscillator O is keyed at K alternately to NSEW and V.

Now both systems NSEW and V radiate a rotating field pattern, but the radiated field from V shows no phase shift round a circle centred at the antenna V, whereas the NSEW system shows a progressive phase shift round such a circle according to the bearing with respect to the transmitter.

It is arranged that the two systems give the same phase in one particular direction, for example north. In all other directions, keying of the transmitter between the two aerial systems will produce a "phase jump" of an amount exactly equal to the bearing with respect to north.

When using low radio frequency for setting up a beacon according to the invention it should not be necessary to add anything to the system of Fig. 1. Phase comparison between the two transmissions would be made at low frequency after heterodyning the signal in the receiver. However, when using a high radio frequency, or when the system is to be used by high speed mobile receivers, an addition becomes necessary for the following reason:

The phase of each transmission rotates through 360° for each wavelength of motion of the receiver to or from the transmitter. In general, motion of the receiver produces a "Doppler frequency," which adds to or substracts from the low or beat frequency resulting from the heterodyned signal. The "phase-jump" at keying will still be correct but a variable beat frequency causes difficulty in the particular method according to the invention to be described more fully hereinafter for phase measurement, owing to the variation of phase shift with frequency in a delay network.

For uses on very high frequency therefore, a second oscillator will be used to radiate omnidirectionally a pure continuous wave which produces in conjunction with the exciting radiation a stable low-frequency beat signal in the receiver. It may be noted that the phase of the beat frequency changes with distance from the transmitter by $2\pi$ radians only for one wavelength of that beat frequency or that movement of the receiver produces a correspondingly small change in the received frequency, but that the rotation of phase with bearing is the same as for the original H. F. transmission.

The receiver is of normal design up to the low-frequency amplifier. The low frequency signal may be produced by the beat between two oscillators at the transmitter when a high radio frequency is used as above described, or by heterodyning in the receiver the high frequency from a single oscillator at the transmitter when a low frequency is used.

Referring to Fig. 2 the low frequency signal, whether produced by heterodyning at the transmitter or receiver is subjected to some filtering to remove noise currents and harmonics produced by the detector, and the output from the filter, indicated by the rectangle LF is applied to two paths having a differential delay. This may be obtained as shown by including in one path a delay network DN. The output from LF is then applied to path No. 1 directly and to path No. 2 through the network DN. The bearing may be recorded on a mechanical dynamometer phasemeter as a measurement of phase difference between the two outputs, or may be recorded on a cathode-ray oscillograph by a similar phase measurement by any of a number of methods available. A cathode-ray oscillograph is indicated at CR in Fig. 2.

The amount of delay in the delay device DN is sufficient to ensure that the two simultaneous outputs may at certain times correspond to radiations which took place at different times, from the different aerial systems at the ground station. It will be shown hereinafter that by a chosen delay and particular keying rhythm at the transmitter this condition can be fulfilled at certain times to provide the bearing indication and at certain other times a "north" or other calibration marking may be obtained. In practice, the delay device DN may consist of a train of about 8 coupled circuits, each tuned to the frequency of the beat note.

Referring now to Fig. 4 this condition will be explained. In Fig. 4 the effect of the use of different keying rhythms for commutation of the transmitter between two aerial systems A and B is shown. In the different representations of rhythm a space A represents the period of one transmitted frequency, the space B the period of an equal frequency, different phase as received and C represents no transmission or a transmission on another frequency.

The first row of spaces A—B represents the rhythm of the received waves in the non-delayed path whilst the second row of spaces represents the rhythm in the delayed path. The third row represents the indication obtained. When two spaces A, or two spaces B overlap there will be recorded no phase difference between the waves in the two paths at this instant, and thus an indication of the reference direction is given since equal phases obtain only in the reference direction as hereinbefore stated and a phase difference is only indicated when a transmission represented by A overlaps at the receiver with a transmission represented by B.

The three horizontal rows of spaces marked "(a)" in Fig. 4 show equal periods of keying to the two aerials and the use of a delay network giving a delay equal to the period of connection of one aerial. The receiver here records $\theta$, the bearing, and also $-\theta$.

The three horizontal rows of spaces marked "(b)" in Fig. 4 show the same transmission as (a) but a reduced differential delay at the receiver. This indicates zero, i. e., no phase difference between the waves during the time the periods A, A overlap, and is the indication for reference direction in which the phases of the directional and non-directional transmissions coincide, i. e., in the direction "north." $+\theta$ and $-\theta$ are also recorded, as will be seen by the overlap of A and B giving $+\theta$, and of B and A giving $-\theta$.

The three horizontal rows of spaces marked "(c)" in Fig. 4 show another keying rhythm and delay, giving the bearing $\theta$ only.

The two groups of three horizontal rows of spaces in Fig. 4 marked "(d)" and "(e)" give N and $\theta$. The "north" indication should coincide with the zero phase position of the indicator and so serves as a permanent check as to whether or not the receiver is correctly adjusted. In practice, a small phase control is provided in the receiver for aligning the "N" indication accurately to the zero or mark N of the scale of the cathode ray oscillograph.

The three horizontal rows of spaces in Fig. 4 marked "(f)" show the keying rhythm and delay of (c) Fig. 4 but with a periodic cessation of keying to increase the period of the A transmission which may be used for adjustment of calibration or "north." When keying recommences, $\theta$ only is recorded.

The phase comparison can be made on a dynamometer phase meter by applying one output to the "search" coil of the meter, the other output being split into diphase currents (in quadrature) to feed the two field windings. This method can be used to give a slow indication, but corresponding high suppression of noise. It is not, however, possible to provide the calibration or "north" marking simultaneously with the bearing.

Fig. 2 shows one arrangement for phase measurement on a cathode-ray oscillograph. One output, e. g., the output from path No. 1 from the low radio frequency amplifier LF of the receiver is split into two phases by means of a phase shifter PS and applied to the deflecting plates of the oscillograph to produce a circular trace on the screen. The beam is, say opposite the upper vertical deflection plate when the wave from LF passes through zero and is increasing. The output of path No. 2 which includes the delay DN, as hereinbefore described, is subjected to the action of a limiter L1 to produce a square wave form whose leading edge coincides with the instant that the original wave passes through zero and is increasing. This wave is then passed through a high-pass filter F to produce a succession of positive and negative pulses which occur respectively at the trailing and leading edges of the square wave form. A unidirectional limiter L2 for example in the form of a single element rectifier now removes alternate pulses (say, the positive), and the remaining pulses are applied to a control electrode CE of the cathode-ray oscillograph, either to focus it and produce a bright spot, or the pulses are supplied to an electron accelerating electrode to produce a sharp kink in the circular trace by modulation of the deflection sensitivity in known manner. Thus the position of the spot or kink represents the instant when the wave in path No. 2 passes through zero and its angular distance from the top vertical plate is a measure of the phase difference between the wave in path No. 1 and that in path No. 2.

A further arrangement for cathode-ray indication is shown in Fig. 3 and this arrangement offers facilities for quick or slow operation with high signal-to-noise ratio in the "slow" position. Differential detectors as described in the specification of my application Ser. No. 457,786, filed September 9, 1942, and indicated at D1 and D2 are used. Here, the L. F. beat-note is passed by means of a transformer T having primary winding P and three secondary windings S1, S2 and S3, through a delay network DN connected to secondary winding S2 and provides two differential detectors D1, D2 with their push-pull inputs. The parallel or reference voltages for the detectors are obtained directly without delay over the secondary windings S1 and S3.

These differential detectors D1, D2 differ from each other only in that the two inputs from the non-delayed signal paths ND1 and ND2 are applied in phase quadrature with respect to each other. This phase quadrature is obtained by including in one of the non-delayed paths ND2 a phase shifter PS which shifts the phase in that path 90° with respect to the phase in the other path.

If now these "parallel" inputs are made large compared with the push-pull inputs, the D. C. outputs from the differential detectors are proportional to the amount of push-pull signal impulse (+) or anti-phase (—) with the corresponding parallel input or reference voltage. With only signals in the non-delayed paths ND1 and ND2 the cathode-ray spot is not deflected from its central position because there is no difference of potential across resistances R5 or R6, but when the delayed signal (in the push-pull path) is added, a difference of potential is added across R5 and across R6, which are applied to the generating plates of CR, but, owing to the 90° phase shift in ND2, these deflecting forces will differ, depending upon the phase difference of the waves in the delayed path DN and in the paths ND1 and ND2. Thus along a radial line depending upon the phase difference between the waves of equal frequencies in the delayed and non-delayed paths and a direct indication of the phase difference is indicated.

Resistances R1, R2, R3, R4 are connected in series in the output of the differential detectors D1 and D2 and in conjunction with C1—C4 form time delay circuits and a switch S is provided to short circuit these resistances R1—R4.

When the switch S is in the "closed" position R1—R4 are short circuited and operation of the cathode-ray oscillograph deflecting system is quick and if the keying rhythm of the transmitter is such that both "north" and "bearing" are indicated, for example as described in connection with Fig. 4 (b, d, e), though they are distinct and separate spot positions, they are recorded on the oscillograph. If the keying rhythm of the transmitter is such that only one phase angle indication occurs between the delayed and non-delayed signal, e. g., Fig. 4c, then S may be opened so that R1C1 ... R4C4 function to provide a high degree of noise suppression and to indicate a single phase angle with a well defined beam trace.

Considering now the arrangements for defining a path, if a transmitter is keyed alternately to two aerials separated by "$n$" wavelengths, then in a direction parallel to the line joining the aerials, the amount of phase jump is $4\pi n$ degrees per degree of azimuth displacement. Thus, for aerial spacing equal to $100\lambda$, if we can measure phase accurately to ±2 degrees, a course line may be set up to $$\pm \frac{2}{4\pi \cdot 100} \text{ degree} = \frac{1}{10} \text{ minute}$$

This represents an accuracy of ±25 yards at 500 miles range.

Multiple course lines of equal constant phase difference are, of course, produced by such a simple antenna system. Doubt as to the correct one to be followed may, however, be eliminated by utilizing aerials spaced at a small distance apart.

It should be noted that the system is not limited to a single course line, as the receiver may measure any desired phase-jump.

In practice it will be desirable to provide considerable antenna directivity in order to provide adequate field strength at maximum range, and in order to avoid distortion of the wave-front by natural obstacles in the vicinity of the aerials.

The two spaced aerials should both be highly directive in the direction of the desired precision course line. This could easily be provided at frequencies of the order of 600 megacycles, when a spacing of 100 wavelength amounts to 50 metres only.

Whilst only two embodiments of the invention have been described, other embodiments and modifications will occur to those skilled in the art and all of which fall within the scope of the invention as defined in the appended claims. For example, a phase difference representing a bearing angle of a radio transmission at a location remote from the automatic radio compass which measures it, may be transmitted by the arrangements according to the invention from the radio compass to the remote location over a pair of wires.

What is claimed is:

1. Method of communicating a phase difference which comprises transmitting over a single channel at least two waves for respective time intervals in succession, at least two of said waves having the same frequency and a phase difference at the receiver which is equal to the said phase difference to be communicated, and receiving the transmitted waves over two different paths having a differential delay of such value that said time intervals of the differently phased waves of equal frequency at the outputs of the two paths overlap for at least part of the time intervals thereof, and measuring the phase difference between the waves in the overlapping portions of said time intervals.

2. A system for commmunicating a phase difference which comprises means for transmitting at respective successive time intervals two waves of equal frequency but differing in phase by a predetermined amount, a receiver provided with two electrical paths having such differential delay that at the output of the two paths the time intervals of the waves of equal frequency overlap for at least a part of the durations thereof, and a phase measuring device for measuring the phase difference between the waves in the overlapping portions of said time intervals in the outputs of said paths.

3. A radio system for determining bearing comprising a radio beacon constituted by a first antenna system arranged to produce a rotating field distribution such that at any radial distance from the centre of said system the phase of the field is constant around said centre and a second antenna system energised during different times from the first antenna system arranged to produce a rotating field distribution coaxial with the distribution of the first antenna system and such that at any radial distance from the axis of the fields the phase of the second field progressively varies around the said axis, means to operate said two antenna systems in succession at a predetermined repetition rate, a receiver provided with two electrical paths having a differential delay such that at the outputs of the two paths the transmissions from the two antenna systems overlap for a period of time, and a phase measuring device to which the outputs from said two paths are applied to obtain a measure of the phase difference of the waves in the overlapping periods of time and hence of the bearing of the receiver with respect to the beacon.

4. A radio system for defining a path in space, comprising two antenna systems at a distance apart and arranged to have overlapping radiation distributions, means to operate said antenna systems in succession at a predetermined repetition rate of time intervals, means to cause said antenna systems to radiate waves of equal frequency during said respective intervals, and a receiver provided with two electrical paths having a differential delay such that at the outputs of the two paths, the waves from the two antenna systems overlap for at least a portion of the transmitting intervals, and a phase measuring device to which the outputs from said two paths are applied, a path being defined by a constant phase difference of the waves in the outputs of said two paths during the overlapping intervals.

5. A system as claimed in claim 3 wherein an additional radiation of frequency differing by a small amount from the frequency of the existing radiation is also radiated to provide a low frequency beat at the receiver.

6. A system as claimed in claim 3 wherein the waves from the two antenna systems are arranged to be in phase in a predetermined direction for example "north."

7. A system as claimed in claim 2 wherein the outputs from the two paths are applied to a mechanical dynamometer type phase meter.

8. A system as claimed in claim 2 wherein the measuring device is a cathode ray oscillograph and the output from one of said paths is applied in phase quadrature to the deflecting elements of the cathode-ray oscillograph and the output from the other path including a delay device is fed through a device for producing a short pulse from said output, representative of the phase of the wave in said other path, said pulse being fed to a control electrode of the cathode-ray oscillograph.

9. A system as claimed in claim 2 wherein the phase measuring device is a cathode ray oscillograph and the output from one path is fed in phase quadrature respectively as the parallel inputs to two differential detector arrangements, and the output from the other path including a delay device is applied to said differential detectors as the push-pull inputs, and the outputs from said differential detectors are fed to respective pairs of deflecting elements of the cathode-ray oscillograph.

10. A system as claimed in claim 2 wherein the phase measuring device is a cathode ray oscillograph and the output from one path is fed in phase quadrature respectively as parallel inputs to two detector circuits, the output from the other path including a delay device is applied to said differential detector circuits as the push-pull inputs, and the outputs from said differential detector circuits include time constant circuits comprising resistance-capacity combinations and are fed to respective pairs of deflecting elements of the cathode ray oscillograph.

11. A system as claimed in claim 2 wherein the phase measuring device is a cathode ray oscillograph and the output from one path is fed in phase quadrature respectively as the parallel inputs to two differential detector circuits, the output from the other path including a delay device is applied to said differential detector circuits as the push-pull inputs, and the outputs from said differential detector circuits include time constant circuits comprising resistance-capacity combinations and are fed to respective pairs of deflecting elements of the cathode ray oscillograph, and wherein arrangements are provided for switching the said time-constant circuits in and out of circuit whereby the operation of the oscillograph is rendered slow or quick.

12. A system as claimed in claim 2 in which the transmissions are made in a periodic rhythm and the differential delay is made equal to the cyclic period of transmission in the rhythm of either transmission of said equal frequencies.

13. A system as claimed in claim 2 in which the transmissions are made in a periodic rhythm and the durations of the transmission of waves of equal frequency are equal and the differential delay in the receiver paths is equal to the duration of a single transmission whereby positive and negative indications of the phase difference may be obtained.

14. A system as claimed in claim 2 in which the transmissions are made alternately, the durations of the waves of equal frequency being equal and the differential delay in the receiver paths being less than the said durations whereby a reference indication of no phase difference and phase difference indications may be alternately obtained.

15. A system as claimed in claim 2 in which the transmission rhythm comprises three time intervals of transmission, the two phased waves of equal frequency being transmitted in succession, then a blank period of no transmission, the said differential delay in the receiver paths being less than the sum of the durations of said waves of equal frequency in the rhythm, whereby a reference indication of no phase difference, a phase difference indication, and a reference indication, in the sequence given, may be obtained for each rhythm period.

16. A system as claimed in claim 2 in which the transmission rhythm comprises three time intervals of transmission, the time intervals of the waves of equal frequency being equal and the differential delay in the receiver paths being equal to one of said time intervals, the rhythm being upset by temporarily increasing the time interval of one of said equal frequency waves, whereby during said increased time interval, a reference indication of no phase difference is obtained during which adjustments may be made.

17. A radio system for determining bearing, as claimed in claim 3, wherein the said first antenna system comprises a linear vertical antenna and said second antenna system comprises two crossed systems each having a figure-of-eight radiation distribution, the first antenna being located at the centre of the second system.

18. The method of communicating a value which comprises the steps of radiating over a single channel at a predetermined rate of succession two different signals which have characteristics differing at the point of reception by the value to be communicated, receiving said signals, dividing the signals thus received into two portions, delaying the signals in one portion a predetermined amount, thereafter comparing the signals in the two portions to determine the difference in characteristics, and using said difference in characteristics as a measure of said value to be communicated.

19. The method according to claim 18, in which the step of comparing the signals comprises utilizing one of the two portions into which said signals are divided to produce a circular trace on a cathode ray tube and the other portion to distort said circular trace at a time determined by the difference in the characteristics of said signals.

20. A system for communicating a value which comprises means intermittently to radiate into space waves having a predetermined frequency at a predetermined repetition rate, means to radiate into space other waves having the same predetermined frequency at the same repetition rate but spaced in time from said first mentioned waves, said other waves having at the point of reception characteristics differing from those of said first waves determined by the value to be communicated, means to receive said waves, means to divide the received waves into two channels, means to delay the waves in one of said channels a predetermined time which is less than the time between two successive repetitions of one of said waves, and means to compare the outputs of said channels to determine the difference in characteristics between said signals.

21. A system according to claim 20, in which a cathode ray tube is provided to compare the characteristics of said two waves and one of said two portions into which said waves are divided is utilized to produce a circular trace on said tube while the other portion is utilized to distort said trace at a time determined by the difference in the characteristics of said waves.

CHARLES WILLIAM EARP.

REFERENCES CITED

The following references are of record in the file of this patent:

UNITED STATES PATENTS

| Number | Name | Date |
| --- | --- | --- |
| 2,192,975 | Kotowski et al. | Mar. 12, 1940 |
| 2,220,183 | Ulbricht | Nov. 5, 1940 |
| 2,252,699 | Byrne | Aug. 19, 1941 |
| 2,288,815 | Luck | July 7, 1942 |